Jan. 22, 1957   F. E. FINLAYSON   2,778,913
TEMPERATURE CONTROL AND SIGNAL CIRCUIT
Filed Oct. 6, 1954   2 Sheets-Sheet 1
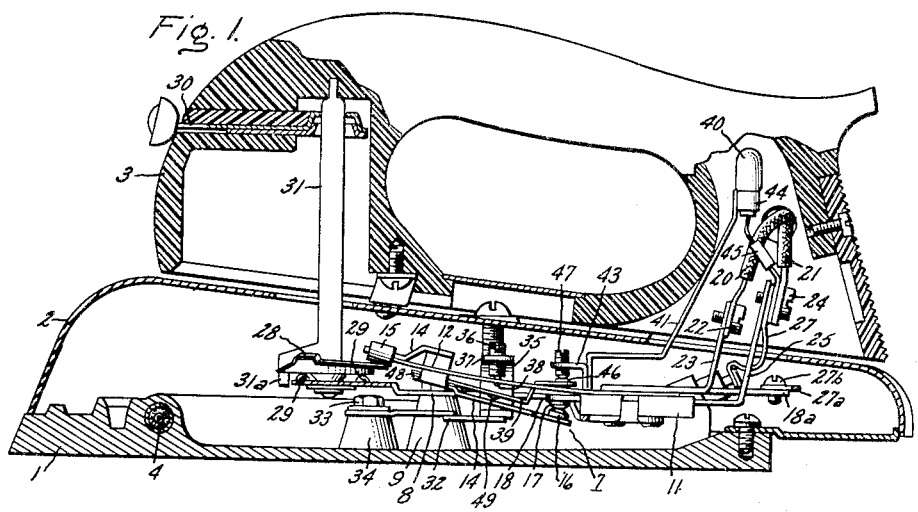
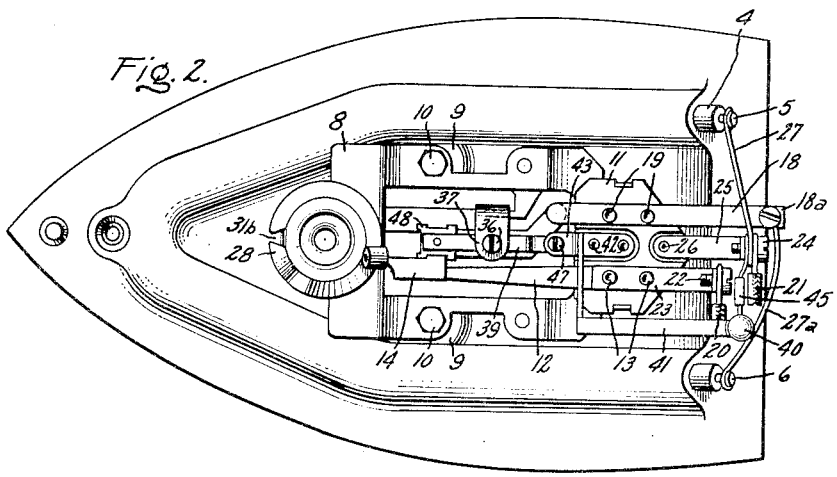
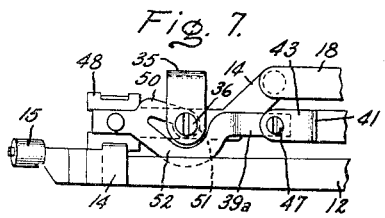
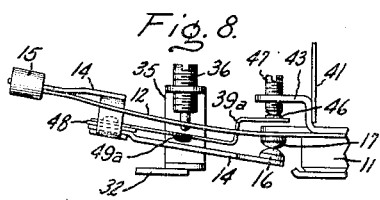
Inventor
Frank E. Finlayson
by
His Attorney

United States Patent Office 2,778,913
Patented Jan. 22, 1957

2,778,913

TEMPERATURE CONTROL AND SIGNAL CIRCUIT

Frank E. Finlayson, Ontario, Calif., assignor to General Electric Company, a corporation of New York Application October 6, 1954, Serial No. 460,642

9 Claims. (Cl. 219—20)

My invention relates to devices such as electric flatirons and the like and more particularly to combined temperature control and signal circuits for use in connection therewith.

In connection with heating devices such as electric flatirons it is customary to provide a thermostatic control arrangement for maintaining the temperature of the iron in any desired range. A signal light is sometimes combined with such a circuit and arranged so that it is energized when the heating element is energized. With such arrangements, the signal light is usually illuminated when the iron is initially plugged in, and it remains illuminated until the iron reaches maximum temperature for the particular setting to which it is adjusted, that is, until the heating element is de-energized. The iron is ready for use when the temperature reaches the minimum point of the particular range for which it is set. However, the user, relying on the signal light with this type of circuit, has no way of telling when the iron has reached this lower end of the temperature range.

It will be apparent also that with this type of circuit, if the temperature setting of the iron is changed to a lower range, the user will have no positive indication when the temperature of the iron reaches this lower range and hence when the soleplate temperature is suitable for ironing the particular type of material for which this lower range is necessary.

To overcome this disadvantage, circuits have heretofore been proposed for electric flatirons in which a separate circuit is provided for the signal light, and the separate circuit is arranged so that the signal light is energized whenever the temperature of the iron is within a predetermined range, depending on the temperature setting employed, and de-energized whenever the temperature of the iron is outside this range. With these circuits it is possible for the user to tell with reasonable certainty when the iron had reached a temperature within the range for which the iron was set. When shifting to a lower temperature setting for example, it is also possible for the user to tell when the iron temperature had decreased to the lower temperature range and hence is suitable for use on fabrics requiring the lower temperature. However, the circuits and switching mechanisms of this type, as far as I am aware, have been unreasonably cumbersome and complex and have required a number of additional parts in order to accomplish the desired result. By my invention, this desired result is accomplished by the simple expedient of interposing a flexible switch arm between the temperature-responsive element and the switch arm employed for temperature control.

It is an object of my invention to provide an improved combined temperature control and signal circuit which is of simple construction, reliable in operation and requires a minimum of parts.

It is another object of my invention to provide a signal circuit which indicates positively when the iron temperature is within the desired range and to accomplish this by a simple addition to mechanism employed for controlling the temperature alone.

Further objects and advantages of my invention will become apparent as the following description proceeds and the features of novelty which characterize my invention will be pointed out with particularity in the claims annexed to and forming part of this specification.

In carrying out the objects of my invention in one form thereof, a flexible resilient switch arm is mounted on the movable switch arm of the temperature control switch and is electrically insulated therefrom at its mounting point. The temperature-responsive element is arranged to engage the flexible arm for causing actuation of the relatively stiff temperature control switch arm. During initial movement of the flexible arm it is forced into electrically conducting engagement with the stiff arm whereby a circuit is closed to the signal device to indicate that the lower end of the desired ironing range has been reached. Further movement of the temperature-responsive element is effective to move the relatively stiff switch arm to open the circuit to the heating element, but the flexibility of the resilient arm allows the signal circuit to remain completed through the flexible arm during normal cycling of the temperature control switch. Whenever the temperature is outside the range for which the iron is set, the circuit through the flexible arm to the signal device is interrupted to de-energize the signal device.

For a better understanding of my invention, reference may be made to the accompanying drawings in which Fig. 1 is a sectional elevation view of an electric flatiron incorporating an embodiment of my invention.

Fig. 2 is a plan view of the flatiron with the handle and cover removed to illustrate the internal construction.

Fig. 7 is a plan view of a portion of the switch mechanism illustrating a modified form of my invention.

Fig. 8 is an elevation view of the portion of the mechanism illustrated in Fig. 7.

Figure 3:
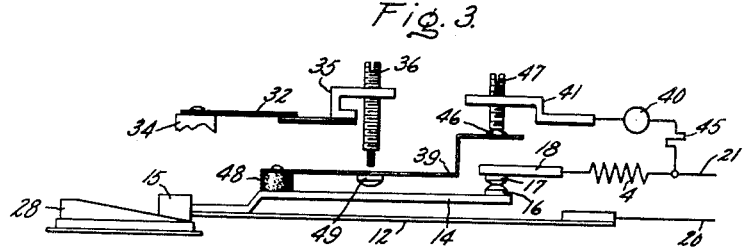
Fig. 3 is a schematic diagram showing the relationship of the combined temperature control and signal circuit parts when the iron has been initially plugged in and before it has reached the lower end of the temperature range for which the control is set.

Referring now to Figs. 1 and 2, there is shown an electric flatiron including a soleplate 1, a cover or shell 2, and a handle 3. Heat is supplied to the soleplate through a heating element 4, preferably of the sheathed type, embedded in the soleplate. The heating element 4 is generally U-shaped and includes terminals 5 and 6 at the rear portion of the iron.

In order to control the temperature of the iron and to give a signal indication when the temperature is within the desired range, the combined temperature control and signal mechanism indicated generally by 7 is employed. This mechanism includes a frame 8 which is supported from bosses 9 on the soleplate by screws 10. An insulating block 11, composed of a suitable electrically insulating material, is mounted at the rear end of the frame 8. A leaf spring 12 is mounted on the insulating block 11 by rivets 13 and extends forwardly therefrom. A relatively stiff switch arm 14 for controlling the energization of the heating element 4 is mounted on the leaf spring at the forward or free end thereof. The leaf spring 12 and the switch arm 14 may be joined in any suitable manner, as by welding or riveting, to provide a good electrically conducting contact therebetween. An insulator 15 is mounted on the common ends of the elements 12 and 14 in any suitable manner, as by having a press fit therewith. The free end of the switch arm 14 has a contact 16 mounted thereon. The movable contact 16 is arranged to cooperate with a stationary contact 17 which is mounted on an arm or terminal bar 18 supported by means of rivets 19 on the insulating block 11. The arm 18 extends rearwardly beyond the insulating block 11 to provide a terminal 18a as shown.

The contacts 16 and 17 are arranged to cooperate for controlling the circuit to the heating element 4. Power is supplied to the flatiron from a suitable source of power through a cord, the ends of which are shown at 20 and 21. Cord end 20 is connected by a screw 22 in electrical engagement with an upwardly extending leg of a terminal bar 23. The bar 23 is mounted on the insulating block 11 by the rivets 13 being held, as illustrated, in firm electrical contact with the end of the leaf spring 12. The other end 21 of the cord is connected by a screw 24 to a terminal bar or strip 25. The strip 25 is mounted on the insulating block 11 by a rivet 26. One end 5 of the heating element is connected to the terminal strip 25 by a strap 27. The other end 6 of the heating element is connected by a strap 27a to the aforementioned rear terminal on the arm 18, a screw 27b being employed to connect the strap 27a to the arm 18. It can be seen that a circuit is provided from the cord ends 20, 21 through the switch contacts 16, 17 in series with a heating element 4, so that the opening and closing of the switch contacts controls the supply of power to the heating element.

To adjust the temperature setting of the iron a cam 28 is provided in engagement with the insulator 15. The insulator 15 is held in engagement with the surface of the cam by the leaf spring 12. The cam 28 is rotatably mounted on the frame in an opening in the forward end of the frame 8. A plurality of projections, two of which are shown at 29, are provided on or formed integral with the frame to facilitate rotation of the cam 28. Rotation of the cam is effected by a control lever 30 at the forward upper portion of the handle 3. An intermediate elongated member 31 is provided to transmit motion from the control lever 30 to the cam 28. The member 31 includes a leg 31a received in a recess 31b in the cam for effecting rotation of the cam.

It can be seen that the upper surface of the cam 28 is sloped so that rotation of the cam varies the position of the insulator 15. In this manner the position of the switch arm 14 is varied so as to adjust the temperature setting. As will be explained in more detail later, as the cam is adjusted to move the insulator 15 to a higher position, the temperature setting of the flatiron is lowered.

In order to effect movement of the switch arm 14 and hence of the movable contact 16, a temperature-responsive element 32 is provided. The element 32 may conveniently be formed of a bimetallic strip, so arranged that the free end thereof bends downwardly as the temperature of the soleplate increases. In order to make the element 32 responsive to the temperature of the soleplate 1, one end of the element 32 is mounted by means of screw 33 on a boss 34 formed integral with and extending upwardly from the soleplate 1. In order to effect actuation of the switch arm 14 by the temperature-responsive member 32 an upwardly extending bracket or member 35 is provided on the free end of the element 32. A calibrating screw 36 is threadedly received in a flange 37 at the upper end of the bracket 35.

Were the lower end 38 of the calibrating screw 36 to engage directly the relatively stiff switch arm 14 for actuation of the movable contact 16 one form of control of the heating element 4 and hence of the temperature of the iron would be provided.

In accordance with my invention however, the actuation of the switch arm 14 by the temperature-responsive element 32 is effected only through an interposed relatively flexible resilient switch arm 39, and thereby a particular control of a signal device circuit for indicating positively when the temperature of the iron is within the desired operating range is secured in a simple and inexpensive manner. In the form of invention illustrated, the arm 39 extends generally parallel to the arm 14 and in spaced relationship thereto. My improved combined temperature and signal circuit includes a signal device, illustrated as a light 40 mounted on a bracket 41. The bracket 41 is mounted on the insulating block 11 by rivets 42 secured thereto, or formed integral therewith, a flange 43. The bracket 41 is of electrically conducting material and is connected to one terminal 44 of the light 40. The other terminal of the light is connected through a resistor 45 to the aforementioned terminal 25 to which one end 21 of the cord is also connected. Thus power is supplied to one side of the light 40 directly from one end 21 of the cord. Power is supplied to the other side of the light 40 from the cord through a path which includes the leaf spring 12, the relatively stiff switch arm 14 and the relatively flexible switch arm 39. Electrical connection between a contact 46 on the arm 39 and the bracket 41 is provided through an adjustable calibrating screw 47 which has threaded engagement with an opening in the flange 43, the contact 46 being biased into engagement with the stationary contact formed by the screw 47 because of the natural resilience of the arm 39. The circuit between the switch arms 14 and 39 is however completed only under certain circumstances, as will be pointed out more clearly in connection with the description of the operation, referring to the schematic drawings. In order to prevent current flow between the switch arms 14 and 39 except under the desired circumstances, the switch arm 39 is mounted at one end on the arm 14 in insulated relation thereto by means of an insulator 48.

The operation of the signal device and of the temperature control mechanism will be clear by reference to the successive schematic diagrams shown in Figs. 3 through 6 inclusive. In Fig. 3 the parts are shown in the positions they occupy after the iron has been plugged in but before any significant heating has been accomplished. In Fig. 3 the control cam 28 is shown in a position for maintaining a relatively high temperature of the iron. It can be seen that the circuit to the heating element 4 is completed from the cord ends 20, 21 through the closed temperature control switch at the contacts 16, 17. The circuit through the light 40 is, however, interrupted since the switch arm 39 of the lamp circuit is insulated electrically from the arm 14 by the insulator 48. Hence, the light 40 is not illuminated, indicating to the user that the iron has not yet reached a temperature range suitable for ironing the fabric for which the control has been set.

Figure 4:
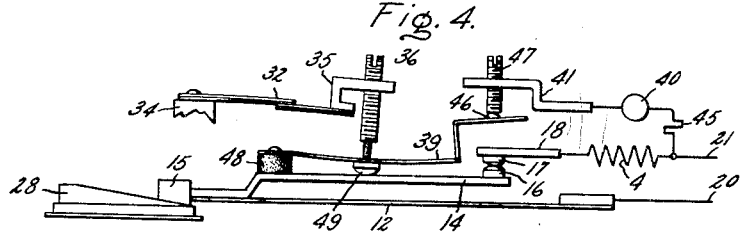
Fig. 4 is a schematic diagram showing the relationship of the parts after the temperature of the iron has reached the lower end of the range for which it is set.

In Fig. 4 the parts are illustrated schematically in the position they occupy when the temperature of the iron has reached the minimum temperature of the range for which the control has been set, but has not yet reached the maximum temperature of that range. It can be seen that as the iron has increased in temperature the temperature-responsive element 32 has bent downwardly, carrying with it the calibrating screw 36. The downward movement has moved the end of calibrating screw into engagement with the relatively flexible resilient switch arm 39. The temperature-responsive element 32 has further moved the arm 39 to bend the arm as indicated and bring a contact 49 on the arm 39 into electrical contact with the relatively stiff arm 14 of the temperature control switch. This completes a circuit from the cord end 20 through the leaf spring 12, the relatively stiff arm 14 of the temperature control switch, contact 49, the relatively flexible switch arm 39 of the signal device circuit, the contact 46, the calibrating or adjusting screw 47, the bracket 41, to the light 40, and thence through the resistor 45 to the other end 21 of the cord. The light 40 is therefore illuminated, indicating to the user that the temperature of the iron has risen into the range for which the control is set, and hence that the iron is now in condition for properly ironing the fabric.

Figure 5:
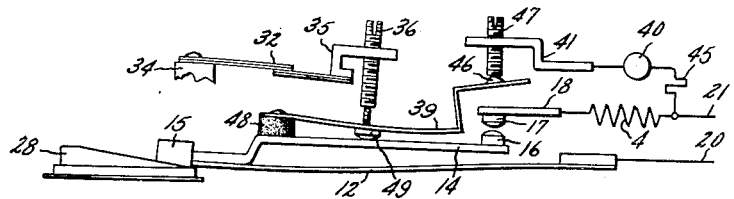
Fig. 5 is a schematic diagram showing the relationship of the parts when the iron temperature has reached the upper limit of the range for which the iron is set and hence when the circuit to the heating element has been interrupted.

As the temperature of the iron increases to the maximum of the range of temperature for which the control is set, the parts of the mechanism reach the position shown schematically in Fig. 5. As there shown, the temperature-responsive element 32 has bent downwardly further under the influence of the increased temperature and this has resulted in moving the relatively stiff switch arm 14 of the temperature control switch downwardly to interrupt the circuit of the heating element at the contacts 16, 17. This movement of the switch arm 14 is, of course, effected by engagement of the temperature-responsive element with the interposed relatively flexible switch arm 39 of the signal circuit, movement of the arm 39 being transmitted to the arm 14 through the contact 49. Under the circuit situation shown in Fig. 5, the circuit of the heating element 4 is interrupted and hence power is no longer supplied to the heating element. However, the temperature of the iron is of course still within the range of temperatures for which the control has been set, and will remain so until the iron reaches the minimum temperature of this range at which point the contact 16, 17 will again be moved into engagement to re-energize the heating element. Thus, during this normal cycling, the temperature of the iron will remain within a range suitable for ironing of the particular fabric for which the control is set. Accordingly, by my invention, in the position of the mechanism shown in Fig. 5, the circuit through the signal light 40 is maintained closed to indicate to the user that the temperature is in the proper operating range, even though the circuit of the heating element is interrupted. This is accomplished because of the flexibility of the arm 39. It can be seen by a comparison of Figs. 4 and 5 that the further movement of the temperature-responsive element to effect opening of the contacts 16 and 17 has merely resulted in an additional bending of the arm 39 without causing the contact 46 thereof to become disengaged from the fixed contact provided by the screw 47. The contact 46 is held in electrical engagement with the screw 47 under these circumstances by the natural resilience of the flexible arm 39. Under the condition shown in Fig. 5, the circuit through the light 40 or other signal device, is the same as that previously described in connection with Fig. 4. Thus the light 40 remains continuously illuminated during the normal cycling of the temperature control switch.

Since the user will normally have occasion to iron a variety of fabrics in a course of a single ironing period, there will generally be some occasion to set the control to a substantially lower temperature, for example, to iron one of the synthetic fabrics. The situation then existing is illustrated schematically in Fig. 6. It will be noted that the cam 28 has been moved to bring the higher portion thereof in engagement with the insulator 15, raising the insulator and its associated switch arm 14 so that actuation of the switch arm is effected by the temperature responsive element 32 at a lower temperature. It will be apparent that if the user has been operating the iron in a relatively high temperature, and then shifts the control to the position shown in Fig. 6, whereby the iron is set to maintain a substantially lower temperature, the temperature of the iron will temporarily be above that suitable for proper ironing of the new fabric. In accordance with my invention, the signal light is immediately extinguished to warn the user that the temperature of the iron is not within the range suitable for ironing of the fabric. This is particularly important in connection with the synthetic fabrics which are coming into increasing use, since these fabrics can be damaged by an iron operated at too high a temperature.

Figure 6:
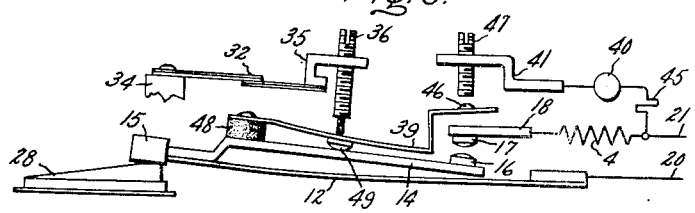
Fig. 6 is a schematic diagram showing the relationship of the parts when the control mechanism has just been adjusted to maintain a lower temperature and hence when the temperature of the iron is above the range for which the control is set.

Referring to Fig. 6, it can be seen that as the cam 28 is shifted to raise the insulator 15, the left end of the relatively stiff switch arm 14 and also the left end of the relatively flexible switch arm 39 mounted thereon are raised. The general effect of this change in temperature setting is to tend to raise also the portion of the switch arm 14 in the region of the lower end of calibrating screw 36 so that the temperature-responsive element 32 will actuated the switch arm 14 and cause interruption of the circuit to the heating element 4 at the contacts 16, 17 at a lower temperature. Under the particular circumstances shown in Fig. 6 where the temperature of the iron is already at a substantially higher value than the maximum of the range for the new setting of the iron, upward movement of the central portion of the relatively stiff switch arm 14 and of the corresponding portion of the flexible switch arm 39 is prevented because of engagement with the lower end of the calibrating screw 36 and the contact 49. Accordingly, the effect of the aforementioned shifting of the cam 28 is to cause a clockwise pivoting of the switch arms 14 and 39, lowering the right end of the switch arm 14 so as to cause an increased separation of the contacts 16, 17 as shown in Fig. 6. It will be apparent, therefore, that the temperature of the iron must decrease to a lower value to allow sufficient movement of the temperature-responsive element for again bringing the contacts 16, 17 into engagement before the heating element will again be energized.

The change in the position of the cam 28 also, as indicated above, causes a clockwise pivoting of the arm 39, so that the natural resilience of this arm is no longer sufficient to maintain the contact 46 in engagement with the lower or contact end of the calibrating screw 47. Accordingly, the circuit of the signal light 40 is interrupted at the contact 46, as shown in Fig. 6. The signal light is thereby extinguished, indicating to the user that the temperature of the iron is not within the range of temperatures involved in the new setting of the iron.

As the iron cools, and eventually reaches the maximum temperature of the new temperature range for which the iron is set, the upward movement of the free end of the temperature-responsive element 32 allows the contact 46 to reengage the lower or contact end of the screw 47, thereby again completing the circuit to the signal light 40 and indicating to the user that the iron is now within the proper operating temperature range. At this time the contacts 16, 17 are still separated, being approximately in a position corresponding to that shown in Fig. 5, so that the circuit of the heating element 4 is still interrupted. As the temperature still further decreases, the parts will ultimately reach a position, corresponding in the new setting to that shown in Fig. 4, where the contacts 16, 17 are again in engagement to energize the heating element 4. As in the previous control setting, however, the normal cycling of the temperature control switch within the chosen temperature range does not affect the circuit through the signal light so that the signal light remains energized during such normal cycling.

The calibrating screw 36 is normally adjusted at the factory to set the temperature control switch so that the temperature maintained by the iron is within the range indicated by the dial associated with the control lever 30. Calibration of the signal circuit switch to adjust the upper temperature at which the signal light 40 is de-energized for any given temperature setting is effected by adjustment of the screw 47. This is, of course, also normally set at the factory, and the user merely chooses the temperature range for proper ironing by adjustment of the control lever 30.

In Figs. 7 and 8, there is shown a modified form of my invention which reduces still further any tendency of the mechanism to interrupt the signal light circuit during normal cycling of the temperature control. Only a very small portion of the mechanism involved with this particular modification has been illustrated in Figs. 7 and 8. The same numerals have been employed to designate the same parts in Figs. 7 and 8 and in the previous figures and modified portions have been identified by utilizing the same numeral as in the corresponding part in the form previously disclosed with the subscript "a" being added to the numeral.

Referring to Figs. 7 and 8, it can be seen that this modification differs from the form previously described in that the flexible switch arm 39a, corresponding to the switch arm 39 of the previous form, includes an offset tongue or member 50 extending laterally from the main portion of the switch arm 39a. The calibrating screw 36 associated with the free end of the temperature-responsive element 32 is arranged to engage the end 51 of this offset tongue 50. In order to provide for the proper relationship of the parts in the assembly previously described, the flexible switch arm 39a includes an arcuate portion 52 in the region of the end 51 of the offset tongue 50.

During normal cycling of the temperature control mechanism the lower end of the calibrating screw 36 engages the end 51 of the offset tongue 50 to bring a contact 49a on the lower surface of the end 51 into engagement with the stiff switch arm 14. Because of the forming of the portion 50 as an offset tongue, movement of this tongue in response to the temperature-responsive element is substantially independent of the main resilient portion of the flexible switch arm 39a. Since the offset tongue 50 can therefore deflect independently of the main portion of the flexible switch arm 39a to engage the stiff switch arm 14, the circuit to the signal light is completed without any tendency to break the circuit at the point of contact between the contact 46 and the screw 47.

While I have shown and described specific embodiments of my invention, I do not desire my invention to be limited to the particular constructions shown and described, and I intend, by the appended claims, to cover all modifications within the spirit and scope of my invention.

What I claim as new and desire to secure by Letters Patent of the United States is:

1. In an electric flatiron or the like including a heating element and a signal device, a combined temperature control and signal circuit comprising a first normally closed switch for controlling energization of the heating element including a movably mounted switch arm, a temperature-responsive element, a flexible signal control switch arm interposed between said movable heating element switch arm and said temperature-responsive element and electrically insulated with respect thereto, signalling means, a normally open switch contact on said flexible switch arm cooperable with said heating element switch arm, a second normally closed switch operated to open position by motion of said flexible switch arm, and means transmitting motion of said temperature-responsive element upon increasing temperature to close said normally open switch contact to energize said signalling means, open said first normally closed switch to de-energize said heating element, and open said second normally closed switch to de-energize said signalling means in sequence.

2. The combination of claim 1 with means for manually adjusting the temperature operating range for said switches.

3. In an electric flatiron or the like including a heating element and a signal device, a combined temperature control and signal circuit comprising a first switch for controlling the energization of the heating element, said switch including a stationary contact and a relatively stiff movable switch arm cooperating with said contact, a temperature-responsive element for actuating said switch arm, a second switch for controlling energization of the signal device, said second switch including a second stationary contact and further including a relatively flexible switch arm cooperating with said second stationary contact and interposed between said temperature-responsive element and said first-named switch arm, and an insulator for mounting said switch arms in electrically insulated spaced relationship, movement of said temperature-responsive element being effective for moving said relatively flexible switch arm into electrically conducting engagement with said relatively stiff switch arm to energize the signal device, further movement of said temperature-responsive element causing movement of said relatively stiff switch arm to de-energize said heating element while continuing energization of said signal device, said relatively flexible switch arm remaining in engagement with said second stationary contact during normal cycling of said first switch.

4. In an electric flatiron or the like including a heating element and a signal device, a combined temperature control and signal circuit comprising a first switch for controlling the energization of the heating element, said switch including a stationary contact and a relatively stiff movable switch arm cooperating with said contact, a temperature-responsive element for actuating said switch arm, a second switch for controlling energization of the signal device, said second switch including a second stationary contact and further including a relatively flexible movable switch arm cooperating with said second stationary contact and interposed between said temperature-responsive element and said first-named switch arm, an insulator for mounting said switch arms in electrically insulated spaced relationship, movement of said temperature-responsive element being effective for moving said flexible switch arm into electrically conducting engagement with said relatively stiff switch arm to energize the signal circuit, further movement of said temperature-responsive element causing movement of said relatively stiff switch arm to de-energize said heating element while continuing energization of said signal device, and means for adjusting the position of said second stationary contact for adjusting the temperature range during which said signal device is energized.

5. In an electric flatiron or the like including a heating element and a signal device, a combined temperature control and signal circuit comprising a first switch for controlling the energization of the heating element, said first switch including a relatively stiff movable switch arm, a temperature-responsive element for actuating said switch arm, a second switch for controlling energization of the signal device, said second switch including a relatively flexible movable switch arm, an electric insulator for mounting one end of said flexible arm on said first-named switch arm in electrically insulated spaced relationship therewith, a contact on one of said arms at an intermediate point along the length thereof adapted to engage the other of said arms, said relatively flexible switch arm being interposed between said temperature-responsive element and said first-named switch arm whereby initial movement of said temperature-responsive element upon increasing temperature causes electrically conducting engagement between said arms at said intermediate contact to complete a circuit to said signal device, further movement of said temperature-responsive element upon increasing temperature causing movement of said relatively stiff switch arm to de-energize said heating element while continuing energization of said signal device, and means for manually adjusting the position of said relatively stiff switch arm with respect to said temperature-responsive element.

6. In an electric flatiron or the like including a heating element and a signal device, a combined temperature control and signal circuit comprising a first switch for controlling the energization of the heating element, said first switch including a relatively stiff movable switch arm, a temperature-responsive element for actuating said switch arm, a second switch for controlling energization of the signal device, said second switch including a relatively flexible movable switch arm, an electric insulator for mounting said flexible switch arm on said first-named switch arm in electrically insulated spaced generally parallel relationship thereto, said flexible switch arm including a first contact near the free end thereof for controlling the signal circuit and a second contact at an intermediate point along the length thereof for engaging said first-named switch arm to complete a circuit to said signal device, said relatively flexible switch arm being interposed between said temperature-responsive device and said first-named switch arm, said temperature-responsive element being arranged for engaging said relatively flexible switch arm at a point thereon in line with said second contact, initial movement of said temperature-responsive device being effective for moving said intermediate contact into engagement with said first-named switch arm to energize said signal device, further movement of said temperature-responsive device being effective to move said first-named switch arm for de-energizing said heating element while continuing energization of said signal device, means for adjusting the position of said first-named switch arm for varying the temperature setting of the flatiron, adjustment of said means to a lower temperature range being effective for pivoting said flexible switch arm at the point of engagement with said temperature-responsive element to open the circuit of said signal device at said first contact.

7. The combination of claim 6 wherein said flexible switch arm is normally urged by its natural resilience in a direction tending to move said first contact to its closed position and wherein adjustment of said means to said lower temperature range prevents said natural resilience of said flexible switch arm from moving said first contact to its closed position.

8. In an electric flatiron or the like including a heating element and a signal device, a combined temperature control and signal circuit comprising a first switch for controlling the energization of the heating element, said first switch including an elongated leaf spring and a relatively stiff movable switch arm supported from the free end of said leaf spring, a second switch for controlling energization of the signal device, said second switch including a relatively flexible movable switch arm interposed between said temperature-responsive element and said first-named switch arm, an insulator mounted on said first-named switch arm for supporting said second-named switch arm in electrically insulated spaced generally parallel relationship, a temperature-responsive element for actuating said first switch, movement of said temperature-responsive element being effective for moving said second-named switch arm into electrically-conducting engagement with said first named switch arm to energize the signal circuit, further movement of said temperature-responsive element causing movement of said first-named switch arm to de-energize said heating element while continuing energization of said signal device, and an adjusting cam engaging the free end of said leaf spring for varying the position of said switch arm to vary the temperature setting of the flatiron, adjustment of said cam to provide a lower temperature setting of the flatiron being effective to cause movement of said second-named switch arm for de-energizing said signal device.

9. The combination of claim 8 wherein said flexible switch arm includes a first contact near the free end thereof controlling the signal circuit and the second contact at an intermediate point along the length thereof for engaging said first-named switch arm to complete a circuit to said signal device, and wherein said temperature-responsive element is arranged for engaging said relatively flexible switch arm at a point thereon in line with said second contact, and wherein movement of said cam to provide the lower temperature setting of the flatiron is effective for pivoting said flexible switch arm at the point of engagement with said temperature-responsive element to open the circuit of said signal device at said first contact.

References Cited in the file of this patent

UNITED STATES PATENTS

| 2,269,112 | Jepson et al. | Jan. 6, 1942 |
| 2,403,824 | Newell | July 9, 1946 |
| 2,439,795 | Clark | Apr. 20, 1948 |
| 2,440,041 | Clark | Apr. 20, 1948 |
| 2,614,199 | Fallon | Oct. 14, 1952 |